United States Patent
Uchida et al.

[11] 4,050,782
[45] Sept. 27, 1977

[54] MODE SEPARATOR AND DELAY EQUALIZER FOR MULTIMODE OPTICAL FIBER TRANSMISSION SYSTEMS

[75] Inventors: Teiji Uchida; Atsufumi Ueki, both of Tokyo, Japan

[73] Assignee: Nippon Electric Company, Ltd., Tokyo, Japan

[21] Appl. No.: 678,636

[22] Filed: Apr. 20, 1976

[30] Foreign Application Priority Data

Apr. 21, 1975 Japan .............................. 50-54324[U]

[51] Int. Cl.$^2$ .......................... G02B 5/14; G02B 3/08
[52] U.S. Cl. ................................. 350/96 C; 350/211; 350/162 ZP
[58] Field of Search .............. 350/96 C, 96 WG, 211, 350/162 ZP; 250/209, 199

[56] References Cited
U.S. PATENT DOCUMENTS

| | | | |
|---|---|---|---|
| 3,263,079 | 7/1966 | Mertz et al. ................... | 350/162 ZP |
| 3,777,149 | 12/1973 | Marcatili ................... | 350/96 WG X |
| 3,777,150 | 12/1973 | Miller ..................... | 350/96 WG X |

*Primary Examiner*—John K. Corbin
*Assistant Examiner*—Rolf Hille
*Attorney, Agent, or Firm*—Hopgood, Calimafde, Kalil, Blaustein & Lieberman

[57] ABSTRACT

The invention contemplates an improved light-mode separator for orientation in axially offset adjacency to an end of an optical fiber, in a plane perpendicular to the fiber axis; separate concentric regions of the separator about the fiber axis have different light-converging properties such that the convergence point for each light-converging region is (a) offset with respect to the convergence point for each remaining light-converging region, and is also (b) independently externally accessible for focused-energy utilization without masking interference with any other converging light from the separator.

9 Claims, 3 Drawing Figures

MODE SEPARATOR AND DELAY EQUALIZER FOR MULTIMODE OPTICAL FIBER TRANSMISSION SYSTEMS

The present invention relates to optical fiber transmission systems, and more particularly to mode separators used for delay equalization in multimode optical fiber transmission systems.

BACKGROUND OF THE INVENTION

In a multimode optical fiber, various transmission mode components propagate with different group velocities, this effect causes the delay distortion in multimode optical fiber transmission systems. As is known, the energy radiated from the end of the fiber is concentrated along a plurality of cones, where each mode has a characteristic cone angle. Thus, by separately detecting the different modes, or groups of modes according to the radiation pattern, it becomes possible to delay the resultant output signals by an appropriate amount relative to each other so as to compensate for the dispersion introduced in the optical transmission wavepath. The signals are then combined in a common output circuit.

As a means for separating the radiation pattern by the wave energy emitted by the fiber, a composite lens has been proposed by Y. Suematsu et al. in "Refractive Index Distribution and Group Delay Characteristics in Multimode Dielectric Optical Waveguides" p. 111 (FIG. 9) published in Electronics and Communications in Japan, Vol. 57-C, No. 9, 1974, pages 105 – 112. According to this technique, lower-order and higher-order mode rays incident on the center and the peripheral areas, respectively, of the composite lens are converged at different positions on the same axis. Input ends of optical fibers different in length from each other which function as delay means are located at the individual light-converging positions. In this construction, however, the lower-order mode rays are converged into the inside of the converging cone formed by the higher-order mode rays. This results in a part of the higher-order mode ray being intercepted by the optical fiber support member used to couple the lower-order mode ray to the optical fiber and by the optical fiber itself. This is why optical loss has been large in the prior art mode separator.

One solution to this problem is found in S. E. Miller's U.S. Pat. No. 3,777,150 issued Dec. 4, 1973. In the Miller Invention, a concentric, circular photodetector for mode separation is located directly near the output end of the multimode optical fiber. One of the problems associated with such system is that the construction of the photodectector is intricate, resulting in low productivity.

It is therefore an object of the invention to provide a mode separator for use in optical fiber communication systems, which can be manufactured with ease and operated with a minimum of optical loss.

With this and other objects in view, the invention provides a mode separator comprising an array of concentric, circular, light converging regions, which is located adjacent to the optical fiber end in a plane perpendicular to the fiber axis. Lower-order mode light rays are converged in the center portions of the individual light converging regions; and higher order mode light rays, in the peripheral portions thereof. The focal lengths and the optical axes of the individual light converging regions are so determined that each of converging points is located outside of other cone-shaped converging mode rays formed by other light converging regions. Thus, by employing eccentric optical systems having different optical axes in the individual light converging regions, a mode separator for optical fiber communications, operable with low optical loss and manufacturable at low costs can be realized.

Further objects, features and advantages of the invention will become more apparent from the following description taken in conjunction with the accompanying drawings, wherein:

DETAILED DESCRIPTION OF THE PREFERRED EMBODIMENT

Figure 1:
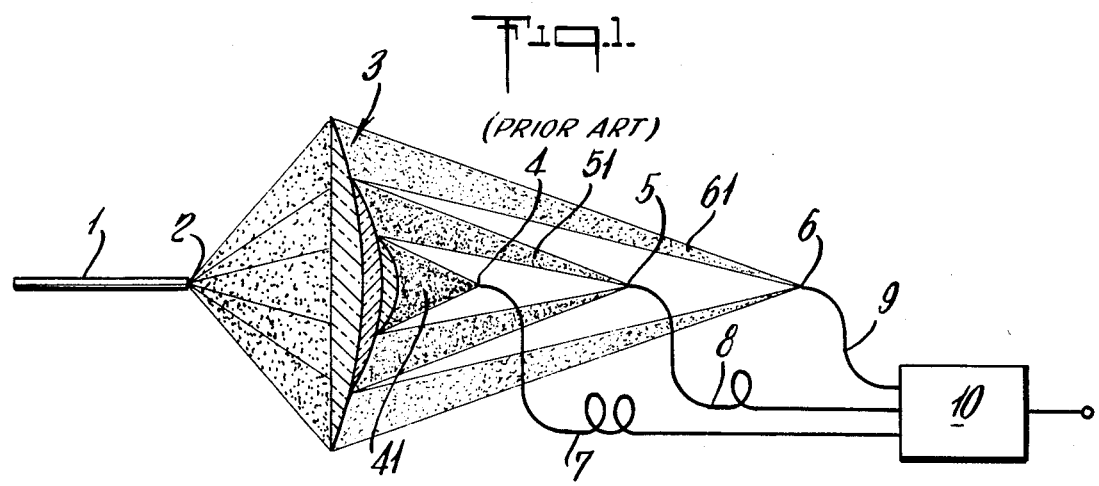
FIG. 1 is a schematic diagram showing the construction of a delay equalizer using a conventional mode separator.

As prior art background, FIG. 1, schematically shows the construction of a delay equalizer proposed by Y. Suematsu et al. in the above mentioned paper, in which a light pulse signal propagated along a multimode optical fiber 1 emerges from an output end 2. The lower-order mode ray is directed to the center area of a composite lens 3 which is a constituent element of the mode separator; and the higher-order mode ray is directed to the peripheral area thereof. Thd focal length of the lens 3 differs in the regions of its center and peripheral areas. Hence the output rays from the optical fiber 1 are converged at positions 4, 5 and 6 through the lens 3 and thus form cone-shaped converging light rays 41, 51 and 61, respectively. Since the optical axes of the individual regions of the lens 3 are made coincident with those of the optical fiber 1, the converging point 4 of the low-order mode ray is located within converging cones 51 and 61 formed by the higher-order mode rays. At the convergence points 4, 5 and 6, input ends of optical fibers 7, 8 and 9 different in length from each other are fixed respectively by a supporting member (not shown). The mode rays coupled to the optical fibers 7, 8 and 9 are delayed by an appropriate amount relative to each other so as to compensate for the dispersion introduced in the multimode optical fiber 1. The mode rays are then applied to a photodetector 10 in which they are converted into an electric signal. Appropriate delays are given by suitably determining the relative lengths of the optical fibers 7, 8 and 9, i.e., a lower-order mode ray is forced to propagate a longer optical fiber than a higher-order mode ray does.

In this prior art mode separator, however, the converging point 4 of the lower-order mode ray is located within the converging cones 51 and 61 formed by the higher-order mode rays, while the input end of the optical fiber 7 must securely be supported in order to attain a higher light coupling efficiency. Accordingly, the supporting member for the optical fiber 7 at it input end, and the optical fiber itself inevitably intercept part of the converging cones 51 and 61. The same problem is seen at the positions of the optical fiber 8 and the light converging cone 61. The smaller the size of the mode separator, the greater the optical loss due to light interception in the cones 51 and 61.

Figure 2:
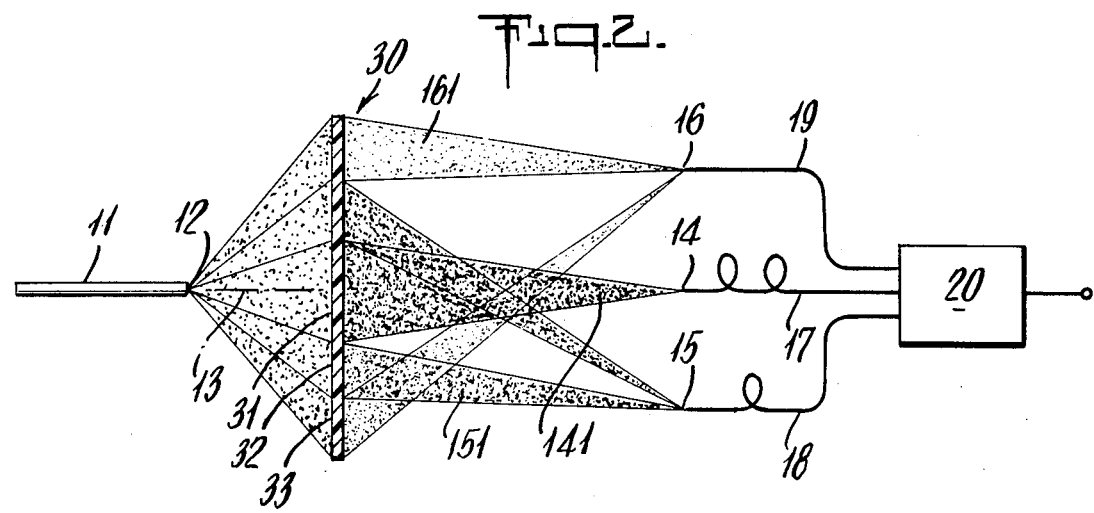
FIG. 2 is a schematic diagram showing the construction of a delay equalizer using a mode separator of a preferred embodiment of the invention.

To FIG. 2 schematically shows the construction of a delay equalizer using a mode separator of a preferred embodiment of the invention, wherein a light signal from an output end 12 of a multimode optical fiber 11 centers an eccentric optical system 30 which constitutes the mode separator. The eccentric optical system 30 comprises a circular Fresnel lens 31 and annular Fresnel lenses 32 and 33, which are disposed concentrically about the optical axis 13 of the optical fiber 11. The Fresnel lenses 31, 32 and 33, have the same focal length and are eccentric with respect to their optical axes although they are concentrically arranged. Therefore the light beams applied to the eccentric optical system 30 are converged at positions 14, 15 and 16, which are located outside the individual light converging cones 141, 151 and 161. In this construction, the input ends of optical fibers 17, 18 and 19 whose lengths differ from each other can be supported at the converging points 14, 15 and 16 respectively without intercepting any other mode rays. As apparent from illustration in FIG. 2, this advantage is available as long as the convergence points are located outside the light converging cones of other modes. Thus, although the Fresnel lenses 31, 32 and 33 have been shown for equal focal lengths, this equality is not a necessary requirement, for direct external and non-interfering access to all convergence points.

The converged mode rays are propagated along the optical fibers 17, 18 and 19 respectively, suitably delayed for delay equalization during propagation, and then applied to a photodetector 20 in which they are converted into an electrical signal in the manner as described by referring to FIG. 1.

Figure 3:
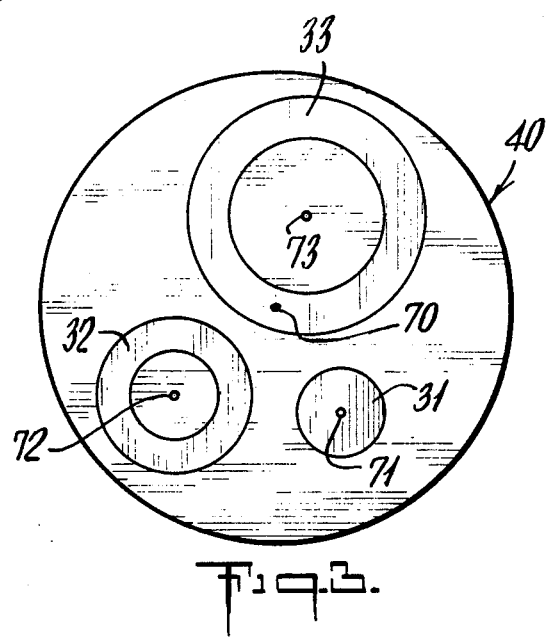
FIG. 3 is a schematic plan view useful for illustrating how to fabricate a mode separator as shown in FIG. 2.

FIG. 3 is a schematic plan view to illustrate how to fabricate the eccentric optical system 30 of FIG. 2, wherein Fresnel lenses 31, 32 and 33 are cut out of a piece of Fresnel lens 40, thus, until cut out and separated, the Fresnel lenses 31, 32 and 33 have their optical axes coincident with the optical axis 70 of the Fresnel lens 40. Hence, by thereafter disposing these Fresnel lenses 31, 32 and 33 concentrically i.e. with their centers 71, 72 and 73 aligned (as in FIG. 2), the optical axes of the Fresnel lenses 31, 32 and 33 become different from each other, to enable establishment of the spaced convergence points 14, 15 and 16 in the same plane.

EXAMPLE

An imaging ratio of 1 : 1 can be obtained by setting the focal length of the eccentric optical system 30 to be 25 mm, and the distance between the output end of the multimode optical fiber 11 and the eccentric optical system 30 to be 50 mm. When the maximum diverging angle of the output light from the multimode optical fiber 11 is 12°, with the outer diameters of Fresnel lenses 31, 32 and 33 chosen to be approximately 9 mm, 16 mm and 21 mm respectively, and the inner diameters of Fresnel lenses 32 and 33 to be approximately 9 mm and 16 mm respectively, then the output light at a diverging angle of smaller than 5° enters the Fresnel lens 31; at the same time, output light at a diverging angle of 5° to 9° enters the Fresnel lens 32; and output light at a diverging angle of 9° to 12° enters the Fresnel lens 33. The light beams incident on the Fresnel lenses 31, 32 and 33 are converged respectively at positions 50 mm away from the eccentric optical system 30. By setting the distance from the center 50 of the Fresnel lens 40 to the centers 71, 72 and 73 of the Fresnel lenses 31, 32 and 33 to be 10 mm, it is possible to locate the convergence points 14, 15 and 16 about 35 mm away from each other.

Assume that a light pulse signal with a pulse width of 3 ns enters the multimode optical fiber 11 5 km in length, and a light pulse signal with a pulse width of 12 ns emerges at the output end. Then, when the lengths of the optical fibers 17, 18 and 19 are determined to be approximately 140 cm, 80 cm and 20 cm respectively, the pulse width of the electrical signal from the photodetector 20 can be narrowed to about 5 ns, permitting light pulse signals to be transmitted at a rate of 200 Mb/s.

According to the invention, Fresnel lenses 31, 32 and 33 may be cut from arbitrary areas of the Fresnel lens 40. Thus, if desired, one of the centers 71, 72 and 73 of the Fresnel lenses 31, 32 and 33 may coincide with the center 70 of the Fresnel lens 40. Further, if desired, the Fresnel lenses 31, 32 and 33 may be cut out of different mother Fresnel lenses. Also, if desired, the eccentric optical system may be made from a spherical lens, a spherical reflection mirror or the like. From the perspective of productivity and cost, it is advantageous to provide the eccentric optical system using Fresnel lenses which can be formed by press process. In other words, press forming makes it possible to produce a plurality of Fresnel lenses which constitute an eccentric optical system, as well as an integrated eccentric Fresnel lens unit.

In the foregoing embodiment, mode separation is carried out on light rays in three ranges of diverging mode angles. The invention is readily applicable to other mode separation where diverging mode angles are divided in a plurality of ranges. It is apparent that the invention is not limited to the disclosed means for delaying the light signals separated according to diverging mode angles. Instead of passing the light signals through the optical fibers 17, 18 and 19, the light signals may be propagated in the form of parallel beams in the air and delayed during propagation. Further, the light signals may be converted into electrical signals through photodetectors located at the converging points 14, 15 and 16 and then passed through coaxial cables or the like for relative delay, as appropriate.

While one preferred embodiment of the invention has been described, it is to be understood that such description is for illustrative purposes only and that changes and variations may be made without departing from the true spirit of the invention.

What is claimed is:

1. For use with an optical fiber transmission line, a light-mode separator located adjacent to said fiber end in a plane perpendicular to said fiber axis comprising: an array of concentric, circular, light-converging regions, each having a different optical axis and dimensioned to focus, within different ranges of angles, wave energy radiated at the end of said fiber, wherein each of the focusing points of the respective light-converging regions is located outside of other conical converging light rays formed by other converging regions.

2. The light-mode separator of claim 1, in which said light-converging regions are Fresnel lens elements.

3. The light-mode separator of claim 2, in which said Fresnel lens elements are essentially flat and of molded plastic.

4. The light-mode separator of claim 3, in which said Fresnel lens elements are integral parts of a single-piece molded-plastic array.

5. For use with an optical fiber transmission line, a light-mode separator adapted for placement adjacent to and offset from the fiber end in a plane perpendicular to the fiber axis, said separator comprising: an array of concentric, circular, light-converging regions of like focal length, each such region having a different optical axis, said different optical axes being parallel to the fiber axis and offset from each other, whereby separate and similarly offset focal points are established in a single focal plane, each focal point being specific for the particular different light mode that is incident upon the associated light-converging region.

6. For use with an optical fiber transmission line, a light-mode separator adapted for placement adjacent to and offset from the fiber end in a plane perpendicular to the fiber axis, said separator comprising: a unitary coplanar array of concentric, circular, Fresnel lens elements, said elements being of such diametral proportions that said elements do not overlap, the optical axis of each element being eccentric to the circular periphery thereof, the eccentric offsets of the optical axes of said elements being in different angular directions with respect to the axis of concentricity of the peripheries of said elements.

7. The method of making a light-mode separator of the character indicated, comprising the steps of selecting a Fresnel lens of desired focal length, cutting from said lens a first and a second circular lens element of diametral proportions such that said elements can be concentrically assembled without radial overlap, the cut region of said Fresnel lens for one element being such that the optical axis of said one cut element is eccentric to the circular periphery thereof, and assembling said elements about a common axis in essentially a single plane, with the optical axis of one element offset from that of the other element.

8. The method of making a light-mode separator of the character indicated, comprising selecting first and second circular Fresnel lens elements of the same focal length, said elements being of such diametral proportions that said elements can be concentrically assembled without radial overlap, and said elements being selected such that the optical axis of at least one of said elements is eccentric to the circular periphery of said one element, and concentrically assembling said elements about a common axis in essentially a single plane, with the optical axis of one element offset from that of the other element.

9. The method of making a light-mode separator of the character indicated, comprising selecting a plurality of circular Fresnel lens elements, said elements being of such diametral proportions that said elements can be concentrically assembled without radial overlap, and said elements being selected such that for each element the optical axis is eccentric to the circular periphery thereof, and assembling said elements in essentially a single plane and about an axis concentric with their peripheries, the assembled optical orientation of said elements being such that their respective optical axes are in mutually offset parallel relation.

* * * * *